UNITED STATES PATENT OFFICE.

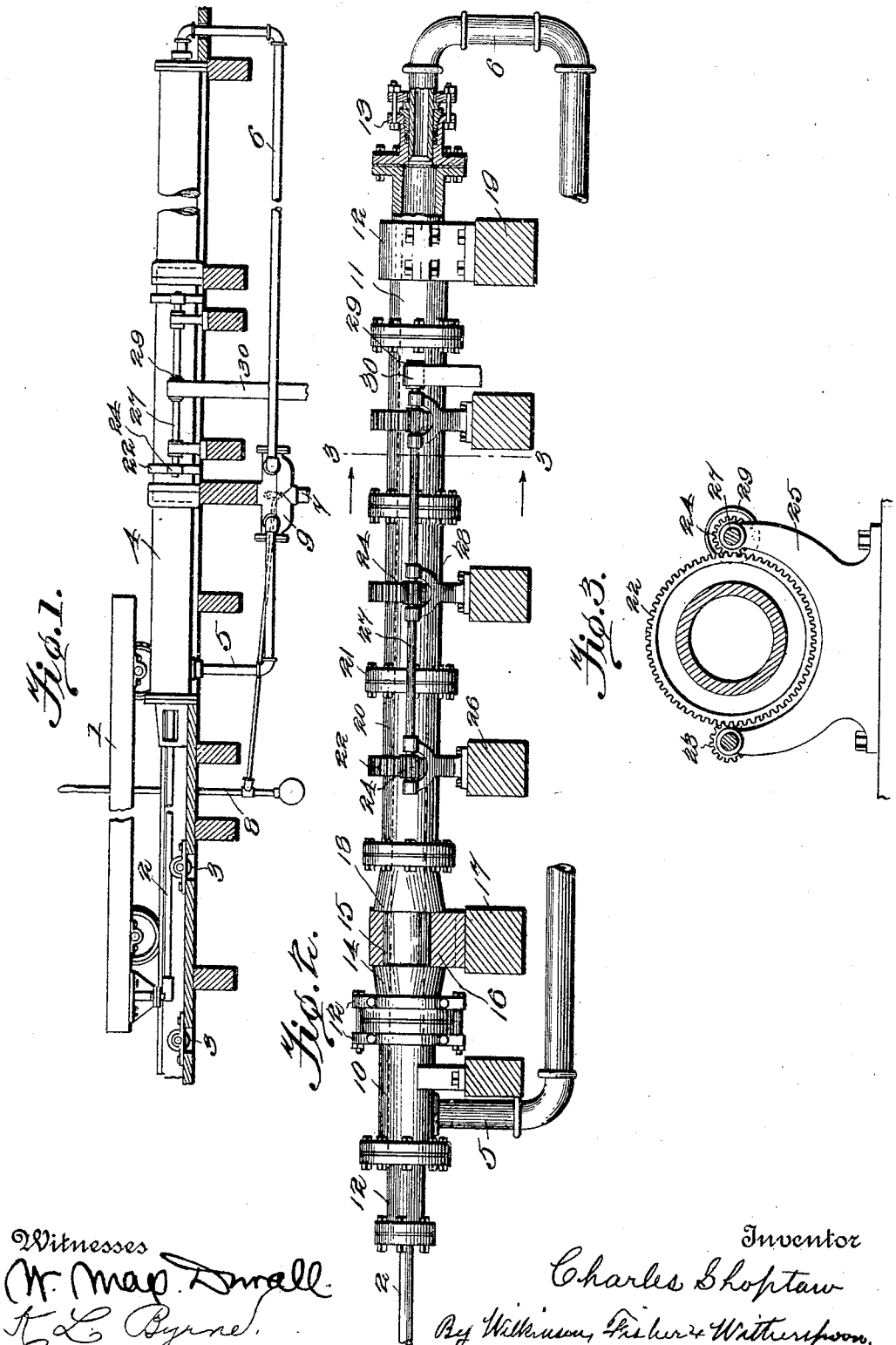

CHARLES SHOPTAW, OF BEAUMONT, TEXAS.

ROTATING STEAM-FEED FOR SAWMILL-CARRIAGES.

932,914. Specification of Letters Patent. Patented Aug. 31, 1909.

Application filed June 9, 1909. Serial No. 501,134.

*To all whom it may concern:*

Be it known that I, CHARLES SHOPTAW, a citizen of the United States, residing at Beaumont, in the county of Jefferson and State of Texas, have invented certain new and useful Improvements in Rotating Steam-Feed for Sawmill-Carriages; and I do hereby declare the following to be a full, clear, and exact description of the invention, such as will enable others skilled in the art to which it appertains to make and use the same.

My invention relates to rotating steam feeds for sawmill carriages, and the object of my invention is to provide simple means whereby the wear usually attendant on the steam cylinder in sawmill feeds may be compensated for in a simple manner.

In ordinary sawmills, the carriage is fed by means of a piston working in a long cylinder, usually from 44 to 60 feet in length, in which cylinder a piston travels, having a long piston rod connected with the sawmill carriage. Owing to the great length of the piston rod, which is operated horizontally, it tend to sag toward the middle and strike the lower part of the cylinder, soon wearing a groove therein. This greatly shortens the life of the cylinder and also requires frequent boring or reaming of the interior of the cylinder to keep its interior surface of uniform size and smoothness and prevent leakage of steam past the piston, and also requires that the piston be frequently repacked.

According to my invention, the ordinary steam cylinder for sawmill feeds is so built that it may be rotated or revolved either constantly and automatically by the movement of the carriage back and forth, or at will by the use of a hand ratchet or lever. By thus causing the cylinder to be rotated, the friction or dragging of the piston rod is not confined to one spot or groove in the bottom of the cylinder, but is distributed over the entire interior surface. My invention therefore prevents, by the rotation of the cylinder, a groove from forming in any one place; keeps the interior of the cylinder smooth or uniform, so that the piston will fit snugly and work smoothly; it prevents the leakage of the steam and consequent loss of power; and finally the distribution of the friction or wearing due to the piston rod adds greatly to the length of life of both the cylinder and the piston rod.

With this object in view, my invention consists in the construction and combinations of parts as hereinafter described and claimed.

In the accompanying drawing—Figure 1 is a side view of a part of a sawmill, showing the carriage and the feeding means, partly broken away. Fig. 2 is a side view, on a larger scale, of the feed cylinder, and Fig. 3 is a cross section on the line 3—3 of Fig. 2, looking in the direction of the arrows.

1 represents a sawmill carriage of the ordinary construction, movable back and forth on rails.

2 represents the piston rod, adapted to travel over rollers 3 on the floor or platform, and 4 represents the cylinder, to which steam is supplied alternately at either end by pipes 5 and 6, connected to the common supply pipe 7.

8 represents a lever for shifting a valve (not shown) in the joint 9, which unites the pipes 5 and 6, all of the parts thus far described, excepting the cylinder, being of the ordinary construction.

The cylinder itself is shown on a larger scale in Fig. 2. It consists of a stationary part 10, provided with a stuffing box, such as 12, the part 10 being connected to the pipe 5.

The stationary part 10 is united to the rotary part of the cylinder by means of flanges 12, bolted together and inclosing a ground joint. The section of the cylinder next to the stationary end 10 is provided with shoulders 14 and 18, leaving a reduced portion 15, which fits in a bearing 16, fastened to a suitable foundation beam 17.

The rotary part of the cylinder consists of the head already described and a number of sections 20, as many of which may be used as desired. These sections are united together by flanged and suitably packed heads 21, bolted together. Any of these sections may be removed and a new one substituted whenever desired. Each section 20 is provided with a gear wheel 22 on its exterior, which meshes with a pair of gear pinions 23 and 24, carried on upwardly projecting arms on the standard 25, which is bolted to a supporting beam 26.

I have shown each of the interior sections of the rotating part of the cylinder, such as 20, as provided with a gear wheel, but this is not necessary, as a single gear wheel at the center, or two gear wheels, one at each end, are amply sufficient to operate the rotating part of the cylinder.

The small pinions, such as 24, are connected together by a shaft 27, passing through a branched support 28, which is a part of the support 25. 29 represents a pulley on said shaft, driven by a belt or sprocket chain such as 30, and arranged to be operated by the movement of the carriage by suitable connections (not shown). If desired, instead of rotating the cylinder constantly, hand ratchet means may be provided, whereby it may be rotated whenever desired. The operation will be evident from the foregoing description. At the other end, the end section 11 of the rotatable part of the cylinder passes through a bearing 12, on a cross beam 19. A stuffing box 13 is provided where the end of the pipe 6 enters the rotatable part of the cylinder.

I claim:—

1. In a rotating steam feed for sawmill carriages, the combination of a cylinder having stationary and rotatable parts, means for rotating said rotatable part, a piston operating in said cylinder, a piston rod connected to said piston, and a sawmill carriage to which one end of said piston rod is attached, substantially as described.

2. In a rotating steam feed for sawmill carriages, the combination of a cylinder, having one end fixed, a rotatable part composed of a number of sections detachably secured together, gearing for operating said rotatable part, a piston mounted in said cylinder, a piston rod connected to said piston, a sawmill carriage connected to said piston rod, and means for supplying steam to either end of said cylinder, substantially as described.

3. In a rotating steam feed for sawmill carriages, the combination of a cylinder having a fixed end and a rotatable part composed of similar sections bolted together, some of said rotatable sections being provided with a gear wheel, a shaft provided with pinions engaging said gear wheel, means for revolving said shaft, the parts of said cylinder being suitably packed to prevent the escape of steam, a piston mounted in said cylinder, a piston rod connected thereto, a sawmill carriage connected to one end of said piston rod, and means for supplying steam to either end of said cylinder, substantially as described.

In testimony whereof, I affix my signature, in presence of two witnesses.

CHARLES SHOPTAW.

Witnesses:
MATT J. CRAWFORD,
G. D. MARTIN.